United States Patent Office 2,806,794
Patented Sept. 17, 1957

1

2,806,794

STABILIZATION OF OIL-CONTAINING COMPOSITIONS WITH REDUCTONES

John E. Hodge, Peoria, and Cyril D. Evans, Peoria Heights, Ill., assignors to the United States of America as represented by the Secretary of Agriculture No Drawing. Application July 8, 1955,
Serial No. 520,933

22 Claims. (Cl. 99—163)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the stabilization of animal and vegetable fats and oils which are normally subject to oxidative deterioration, particularly such animal fats as lard and such vegetable or glyceride oils as cottonseed oil, soybean oil, and corn oil, and to such related materials as synthetically produced esters of long chain fatty acids, by incorporating therein novel additives thereby preventing such oxidative deterioration and consequently increasing the storage life and utility of such fatty substances. It relates, in paarticular, to such stabilized compositions.

The invention relates, in one of its chief aspects, to the stabilization of glyceride oils in raw, refined or hydrogenated form, by means of novel additives and novel combinations of additives, whereby the oxidative stability of said oils are greatly increased.

Glyceride oils of animal or vegetable origin are known to deteriorate upon storage and to develop off-flavors and odors which reduce their utility as food materials or as ingredients in pharmaceutical or cosmetic compositions. This deterioration is mainly caused by autooxidative processes which are extremely difficult to control.

This invention is based upon the discovery that certain chemical compounds, when added to animal and vegetable fats and oils, particularly glyceride oils, in minor amounts, greatly increase the oxidative stability of the fats and oils. These compounds are disclosed and claimed in the copending application of John E. Hodge, Serial No. 512,915, filed June 2, 1955.

As disclosed in the copending application, the stabilizing agents of this invention are amino-glycose-reductones and anhydro-amino-glycose-reductones, and they have the following general formulae.

$C_nH_{(2n-5)}O_{(n-3)}NRR'$

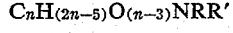
Amino-glycose-reductone $C_nH_{(2n-7)}O_{(n-4)}NRR'$

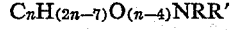
Anhydro-amino-glycose-reductone where $n$ is an integer greater than 4 and less than 8, and

2

R and R' may be the same or a different organic radical, such as alkyl, aryl, or aralkyl. In addition, the two radicals A and R' may be joined by an alkylene chain, such as in the piperidyl radical or by an oxygen interrupted alkylene chain such as the morpholinyl radical. The radicals R and R' may be substituted by various radicals or substituents which are inert. One of the radicals R or R' may also be hydrogen. Examples of particular substituents are ethyl, propyl, butyl, hexyl, hydroxypropyl, tolyl, benzyl, phenyl, and the like.

As disclosed in the copending application, the reductones and anhydro-reductones of this invention have 2 major portions of basic molecular structure, one of which is derived from an amine, HNRR, and the other derived from a reducing sugar, $C_nH_{2n}O_n$. The former and latter interact to form a glycosylamine which, in turn, may be rearranged into a deoxyaminoketose. This ketose may then be transformed by steps into amino-glycose-reductone and anhydro-amino-glycose-reductone by the process of the copending application. Suitable reducing sugars are heptoses, hexoses, pentoses, methyl pentoses, deoxy sugars, amino sugars, sugar acids, tetroses, trioses, bioses and they may be aldoses or ketoses. Most important at present, economically speaking, are the aldohexoses such as D-glucose, D-galactose or D-mannose, or ketohexoses such as D-fructose or L-sorbose.

The amine starting material may be any primary or secondary amine, including aliphatic, aromatic, aralkyl, alicyclic and heterocyclic amines and amino acids.

In the case of primary amines, such as ethanolamine, benzylamine, α-phenylethylamine, 3-methoxypropylamine, glycine or alanine, the reductone is generally microcrystalline or amorphous; whereas, in the case of secondary amines, macrocrystalline products are obtained. For the purpose of this invention, the reductones and anhydro-reductones derived from secondary amines are preferred. Examples are piperidino-hexose-reductone, anhydro-piperidino-reductone, morpholino-hexose-reductone, anhydro-morpholino-hexose-reductone, dimethylamino-hexose-reductone, anhydro-dimethylamino-hexose-reductone, diallylamino - hexose - reductone, anhydro - diallylamino - hexose-reductone, di-n-butylamino-hexose-reductone, anhydro-di-n-butylamino-hexose-reductone, piperazino - di - (hexose-reductone), and the like.

The following specific examples illustrate the invention.

EXAMPLE 1

A number of samples of cottonseed oil were placed in closed containers and treated with hexose-reductones as indicated in Table I. The samples were maintained at 60° C., and gaseous oxygen was introduced under pressure. At the periods shown by the various column headings, the quantity of oxygen absorbed by the oil was calculated from the changes in pressure, the value in each column being cumulative with the preceding values. A parallel control sample containing no additive was run, and the data is also recorded in Table I.

*Table I.—Oxygen absorption of reductone treated cottonseed oil*

[Ml. $O_2$ absorbed per kg. oil at 60° C.]

| Reductone | 5 hours[1] | 27 hours | 52 hours | 74 hours | 98 hours | 126 hours | 150 hours | 174 hours | 191 hours | 215 hours | 237 hours |
|---|---|---|---|---|---|---|---|---|---|---|---|
| 1. Control | 107 | 200 | 343 | 466 | 657 | 937 | 1,030 | 1,067 | | | |
| 2. .01% dimethylamino | 109 | 117 | 126 | 126 | 131 | 151 | 159 | 173 | 206 | 321 | |
| 3. .01% anhydro dimethylamino | 103 | 112 | 119 | 123 | 130 | 137 | 147 | 158 | 175 | 207 | 284 |
| 4. .01% piperidino | 98 | 106 | 114 | 123 | 131 | 142 | 153 | 181 | 257 | 388 | 547 |
| 5. .01% anhydro piperidino | 107 | 121 | 128 | 135 | 142 | 150 | 160 | 185 | 230 | | |
| 6. .005% ascorbic acid plus .005% anhydro piperidino | 115 | 128 | 137 | 151 | 190 | 305 | 450 | 630 | 760 | | |

[1] Essentially amount of oxygen dissolved in the oil (unreacted).

As may be seen from Table I, there is a period during which very little oxygen is absorbed, and the rate of oxygen uptake is slow. The end of this period, which may be termed an induction period, is detectable as a pronounced increase or break-point in the rate of oxygen uptake. Table II shows the break-points for this experiment. Table II also shows the time required to reach a peroxide value of 20 for each of the samples.

*Table II.—Break points of stabilized cottonseed oil*

| Reductone | Hours to attain Break Point | Hours to attain A Peroxide Value of 20 |
|---|---|---|
| 1. Control | 7 | 48 |
| 2. 0.01% dimethylamino | 191 | 216 |
| 3. 0.01% anhydro dimethylamino | 200 | 245 |
| 4. 0.01% piperidino | 175 | 203 |
| 5. 0.01% anhydro piperidino | 175 | est. (215) |
| 6. 0.005% ascorbic acid plus 0.005% anhydro piperidino | 85 | 130 |

With further regard to Table II it was interesting to find that the control oil reached a peroxide value of 20 in 48 hours, or a considerable time before any of the reductone-treated samples reached a peroxide value of 20.

EXAMPLE 2

Samples of deodorized soybean oil, cottonseed oil, corn oil, hydrogenated soybean oil, hydrogenated cottonseed oil, lard and undeodorized soybean oil were treated with various oxidation inhibitors or stabilizers, including those of this invention. The samples, including one control for each substance which contained no stabilizer, were subjected to the oxygenating conditions of the Active Oxygen Method. Determination of peroxide values was made periodically, and the times elapsed to reach a peroxide value of 20 were observed. The results are given in Table III.

*Table III.—Stability evaluation as indicated by induction period determined by active oxygen method at 100° C.*

| Additives—Each at 0.01% concentration | Time in hours to reach a peroxide value of 20 | | | | | | | | |
|---|---|---|---|---|---|---|---|---|---|
| | Soybean oil | Cottonseed oil | Corn oil | Hydrogenated soybean oil | Hydrogenated cottonseed oil | Lard I | Lard II | Lard III | Undeodorized soybean oil |
| 1. Control | 5.5 | 4.5 | 3.5 | 32 | 95 | 5.5 | 4.0 | 3.5 | 1.5 |
| 2. Ascorbic acid | 13 | 5.5 | 9.0 | 62 | 100 | 7.5 | | 4.3 | |
| 3. Ascorbyl palmitate | | | | | | 4.5 | | | |
| 4. Citric acid | 10 | 4.5 | 8.3 | 60 | 96 | 8.5 | 6.5 | 5.5 | 1.5 |
| 5. Propyl gallate | 4.8 | 17 | 4.0 | 144 | [2] 72 | 41 | 32 | | |
| 6. "Sustane Six"[1] | | | | | | 25 | | | |
| 7. Dimethylamino reductone | 23 | 28 | 9.0 | 143 | 182 | 83 | 80 | | |
| 8. Diallylamino reductone | 17 | 18 | | | | 49 | | | |
| 9. Di-n-butylamino reductone | | | | | | 65 | | | |
| 10. Morpholino reductone | 17 | 14 | 9.3 | 155 | 175 | 80 | | 49 | |
| 11. Piperidino reductone | 19 | 18 | 6.3 | 113 | 168 | 78 | | | |
| 12. Dimethylamino reductone plus ascorbic acid | 33 | 31 | 21 | 160 | 192 | 129 | | 112 | |
| 13. Dimethylamino reductone plus citric acid | 32 | 28 | 18 | 126 | | 101 | | 97 | |
| 14. Dimethylamino reductone plus propyl gallate | 21 | 37 | | 242 | | 145 | | 166 | |
| 15. Anhydro-dimethylamino reductone | 25 | 34 | 10 | 150 | 185 | 121 | | | |
| 16. Anhydro-dimethylamino reductone plus ascorbic acid | | 36 | 25 | 148 | 192 | 145 | | | |
| 17. Anhydro-dimethylamino reductone plus citric acid | 37 | 37 | 23 | 128 | 179 | 123 | | | |
| 18. Anhydro-dimethylamino reductone plus propyl gallate | 25 | | | 250 | | 196 | | | |
| 19. Anhydro-piperidino reductone | 20 | 25 | 7.0 | 133 | 165 | 83 | | | 5.0 |
| 20. Anhydro-piperidino reductone plus ascorbic acid | 32 | 32 | 21 | 155 | | 161 | | | |
| 21. Anhydro-piperidino reductone plus citric acid | 29 | 27 | 18 | 140 | | 105 | | | 11 |
| 22. Anhydro-piperidino reductone plus propyl gallate | 25 | | | 244 | | 150 | | | |

[1] A commercial antioxidant containing 18 parts butylated hydroxyanisole and 22 parts butylated hydroxy toluene in 60 parts of cotton seed oil.
[2] Peroxide value at the hours indicated is less than 10.

It will be noted from Table III that mixtures of the reductones of this invention with ascorbic acid or citric acid, or propylgallate show a surprising synergistic effect in stabilizing lard. This effect does not appear with the fatty materials other than those comprising lard.

EXAMPLE 3

Samples of cottonseed oil were treated with 0.01 percent reductone in alcohol solution, and the alcohol removed by steam stripping at 100° C. for one hour. Portions were subjected to the active oxygen method (A. O. M.) of the Swift stability test and the 8-hour A. O. M. values determined. Corresponding determinations were made on controls for each oil in which no stabilizer was added. The samples were subjected to a combined organoleptic and chemical evaluation. The former consisted of taste-testing by a panel of experienced analytical taste experts who graded the oils at each test on a scale of 0 to 10, the highest score corresponding to the blandest sample. At each tasting the peroxide values of the samples were also determined. The results, averages of several duplicate observations, are recorded in Table IV.

Table IV.—Organoleptic and oxidative evaluations of cottonseed oil stabilized with reductones

| Reductone 0.01% | Peroxide Value A. O. M. Conditions 8 hr. | 0 time Flavor Score (P. V.) | After 4 days' storage at 60° C. Flavor Score (P. V.) | After 7 days' storage at 60° C. Flavor Score (P. V.) | After 10 days' storage at 60° C. Flavor Score (P. V.) | After 15 days' storage at 60° C. Flavor Score (P. V.) |
|---|---|---|---|---|---|---|
| Dimethylamino | .09 | 8.7 (0.00) | 7.8 (0.26) | 6.6 (0.39) | | 5.5 (1.4) |
| Control | 13.0 | 8.9 (0.42) | 6.5 (2.38) | 5.7 (7.89) | | 4.9 (27.0) |
| Anhydro dimethylamino | 0.00 | 8.5 (0.00) | 6.7 (0.20) | 6.9 (0.43) | | |
| Control | 13.0 | 8.5 (0.35) | 7.2 (2.10) | 5.4 (8.83) | | |
| Piperidino | 0.46 | 8.4 (0.00) | 6.8 (0.33) | 6.2 (0.87) | | |
| Control | 14.5 | 8.3 (0.56) | 6.2 (2.26) | 4.2 (7.13) | | |
| Anhydro piperidino | 0.14 | 8.4 (0.00) | 7.3 (0.50) | 6.7 (0.81) | 6.3 (1.14) | 5.5 (1.58) |
| Control | 14.5 | 8.6 (0.50) | 5.5 (1.92) | 4.7 (10.3) | 5.3 (15.0) | 4.4 (28.0) |
| Di-n-butylamino | 1.1 | 8.6 (0.29) | 7.5 (1.00) | 6.6 (1.27) | | |
| Control | 11.0 | 8.7 (0.59) | 6.1 (1.81) | 6.0 (8.65) | | |

EXAMPLE 4

The procedure of Example 3 was followed, using instead samples of hydrogenated cottonseed oil. The results are given in Table V.

Table V.—Organoleptic and oxidative evaluation of hydrogenated cottonseed oil stabilized with reductones

| Reductone 0.01% | Peroxide value A. O. M. 30 | 0 time Flavor Score (P. V.) | After 7 days' storage at 60° C. Flavor Score (P. V.) |
|---|---|---|---|
| Anhydro dimethylamino | 0.03 | 7.9 (0.00) | 5.1 (0.00) |
| Control | 11.00 | 7.1 (0.00) | 6.1 (3.5) |
| Dimethylamino | 0.00 | 6.9 (0.00) | 4.6 (0.00) |
| Control | 11.00 | 7.0 (0.00) | 5.1 (3.7) |
| Anhydro piperidino | 0.06 | 8.4 (0.00) | 5.5 (0.00) |
| Control | 11.00 | 8.3 (0.00) | 6.1 (2.8) |
| Piperidino | 0.06 | 7.7 (0.00) | 4.8 (0.00) |
| Control | 10.00 | 8.0 (0.00) | 4.9 (3.5) |

EXAMPLE 5

The procedure of Example 4 was followed, using soybean oil. In the experiment half of the samples were steam stripped at 210° C. for 3 hours as indicated in Table VI.

Table VI.—Oxidative and organoleptic evolution of soybean oil stabilized with reductones

| Reductone 0.01% | Peroxide value A. O. M. Conditions 8 hr. | 0 Time Flavor Score (P. V.) | After 4 days' storage at 60° C. Flavor Score (P. V.) |
|---|---|---|---|
| anhydro piperidino | 1.38 | 7.4 (0.00) | 4.1 (0.57) |
| (control) | 28.0 | 7.2 (0.74) | 4.5 (5.92) |
| di-n-butylamino | 2.17 | 7.8 (0.16) | 3.8 (1.0) |
| (control) | 28.0 | 6.0 (0.77) | 5.3 (6.7) |
| piperidino | 1.79 | 8.5 (0.00) | 4.9 (0.85) |
| (control) | 28.0 | 7.7 (0.76) | 4.9 (5.67) |
| dimethylamino | 1.73 | 8.0 (0.00) | 4.7 (0.56) |
| (control) | 28.0 | 6.9 (0.56) | 4.5 (6.2) |
| anhydro dimethylamino | 0.65 | 8.3 (0.00) | 4.7 (0.20) |
| (control) | 32.0 | 7.2 (0.35) | 5.0 (6.36) |
| dimethylamino [1] | 23.0 | 7.7 (0.15) | 6.3 (4.03) |
| (control) [1] | 28.0 | 6.8 (0.58) | 5.4 (7.14) |
| piperidino [1] | 17.5 | 8.0 (0.24) | 5.2 (1.64) |
| (control) [1] | 28.0 | 6.7 (0.67) | 4.6 (6.21) |
| di-n-butylamino [1] | 9.2 | 7.1 (0.22) | 3.2 (2.0) |
| (control) [1] | 28.0 | 6.1 (0.71) | 4.8 (7.2) |
| anhydro piperidino [1] | 14.5 | 8.1 (0.22) | 5.8 (2.38) |
| (control) [1] | 28.0 | 7.3 (0.56) | 5.1 (6.82) |
| anhydro dimethylamino [1] | 17.0 | 8.2 (0.33) | 5.3 (2.21) |
| (control) [1] | 32.0 | 7.1 (0.46) | 5.5 (8.0) |

[1] Steam stripped at 210° C. for 3 hours.

From the above table it may be seen that the reductone stabilizers impart considerable stability to the oils even at high and prolonged temperatures.

EXAMPLE 6

Several reductones were dissolved in butter oil without the aid of solvents. Antioxygenic indices (AI) were obtained by the active oxygen method, the stability values being based on the number of hours required to reach a peroxide value of 1.0, i. e., where the first off flavors develop. The results are given in Table VII.

Table VII

| Reductone | 0.0025% | | 0.005% | |
|---|---|---|---|---|
| | Hours | Antioxidant Index | Hours | Antioxidant Index |
| None—control | 8 | | 8 | |
| Di-n-butylamino | 30 | 3.7 | 48 | 6.0 |
| Dimethylamino | 30 | 3.7 | 74 | 9.2 |
| Anhydro dimethylamino | 72 | 9.0 | 106 | 13.2 |
| Piperidino | 32 | 4.0 | 76 | 9.5 |
| Anhydro piperidino | 44 | 5.5 | 86 | 10.7 |
| Morpholino | 48 | 6.0 | 72 | 9.0 |

EXAMPLE 7

A sample of lard was treated with increasing concentrations (0.01%, 0.05%, and 0.10%) of di-octadecylamino-hexose-reductone. This reductone is a mixture of di-alkylamino-hexose-reductones, in which the alkyl groups are predominantly octadecyl groups. This reductone mixture was prepared according to the method disclosed in the prior application of Hodge, mentioned previously. In the preparation, a commercially available mixture of long chain aliphatic secondary amines was used, made from tallow fatty acids.

Samples of the treated lard, together with an untreated control, were subjected to A. O. M. conditions. In the control a peroxide value of 20 was reached in 5 hours. At 8 hours it had increased to 100. In the treated samples, the peroxide values at the end of 8 hours were respectively, 5.2, 2.7, and 1.8.

In addition to the foregoing uses, the amino-glycose-reductones of this invention are useful in preventing the oxidative deterioration in such fatty foods as margarine, cocoa, chocolate, bacon, fish, prepared meats, soups, sandwich spreads, peanut butter, canned bread, nut meats, mayonnaise, French dressings, milk, ice cream and frozen desserts (melorine), dried, powdered, and frozen milks, dehydrated foods, deep-fat fried foods such as potato chips and doughnuts, frozen ready-to-serve meals, baby foods, cheese products, and the like. They are also useful in preserving essential oils, preserved fruits, candies, icings, coatings, chewing gum, vitamins in liquid or capsule form, cosmetics such as hand creams, face creams, soaps, lotions, perfumes, shampoos, animal feeds, inedible fats, paper for food wrapping or containers, gasoline, petroleum oils, turbine oil, lubricating oils, transformer oils, and the like.

What is claimed is:

1. A composition comprising a material subject to oxidative deterioration and selected from the class consisting of fats and oils having incorporated therein a reductone selected from the group consisting of an amino-glycose-reductone and an anhydro-amino-glycose-reductone to stabilize said material against such deterioration.

2. A composition comprising a material subject to oxidative deterioration and selected from the class consisting of fats and oils having incorporated therein a reductone selected from the group consisting of an amino-glycose-reductone having the formula $C_nH_{(2n-5)}O_{(n-3)}NRR'$ and an anhydro-amino-glycose-reductone having the formula $C_nH_{(2n-7)}O_{(n-4)}NRR'$ and wherein $n$ is an integer greater than 4 and less than 8, R is a member selected from the group consisting of an alkyl radical, an aryl radical, and an aralkyl radical, R' is a member selected from the group consisting of an alkyl radical, an aryl radical, and an aralkyl radical, a reductone of the above formulae in which $n$, R, and R' have the same significance as above and in which R and R' are joined by an alkylene chain, and a reductone of the above formulae in which $n$, R, and R' have the same significance as above and in which R and R' are joined by an oxygen interrupted alkylene chain to stabilize said material against such deterioration.

3. The composition of claim 2 wherein the material is an oil.

4. The composition of claim 3 wherein the oil is cottonseed oil.

5. The composition of claim 3 wherein the oil is soybean oil.

6. The composition of claim 3 wherein the oil is corn oil.

7. The composition of claim 2 wherein the material is a fat.

8. The composition of claim 7 wherein the fat is lard.

9. The composition of claim 2 in which the reductone is an amino-glycose-reductone having the formula $C_nH_{(2n-5)}O_{(n-3)}NRR'$ wherein $n$ is an integer greater than 4 and less than 8, R is a member selected from the group consisting of an alykl radical, an aryl radical, and an aralkyl radical, R' is a member selected from the group consisting of an alkyl radical, an aryl radical, and and aralkyl radical, a reductone of the above formula in which $n$, R, and R' have the same significance as above and in which R and R' are joined by an alkylene chain, and a reductone of the above formula in which $n$, R, and R' have the same significance as above and in which R and R' are joined by an oxygen interrupted alkylene chain.

10. The composition of claim 9 wherein the reductone is a dimethylamino-hexose-reductone.

11. The composition of claim 9 wherein the reductone is a piperidino-hexose-reductone.

12. The composition of claim 2 in which the reductone is an anhydro-amino-glycose-reductone having the formula $C_nH_{(2n-7)}O_{(n-4)}NRR'$ wherein $n$ is an integer greater than 4 and less than 8, R is a member selected from the group consisting of an alkyl radical, an aryl radical, and an aralkyl radical, R' is a member selected from the group consisting of an alkyl radical, an aryl radical, and an aralkyl radical, a reductone of the above formula in which $n$, R, and R' have the same significance as above and in which R and R' are joined by an alkylene chain and a reductone of the above formula in which $n$, R, and R' have the same significance as above and in which R and R' are joined by an oxygen interrupted alkylene chain.

13. The composition of claim 12 wherein the reductone is an anhydro-dimethylamino-hexose-reductone.

14. The composition of claim 12 wherein the reductone is an anhydro-piperidino-hexose-reductone.

15. A composition stabilized against oxidative deterioration comprising lard having incorporated therein a member selected from the group consisting of ascorbic acid, citric acid, and propyl gallate, and a reductone selected from the group consisting of an amino-glycose-reductone and an anhydro-amino-glycose-reductone.

16. A composition stabilized against oxidative deterioration comprising lard having incorporated therein a member selected from the group consisting of ascorbic acid, citric acid, and propyl gallate, and a reductone selected from the group consisting of an amino-glycose-reductone having the formula $C_nH_{(2n-5)}O_{(n-3)}NRR'$ and an anhydro-amino-glycose-reductone having the formula $C_nH_{(2n-7)}O_{(n-4)}NRR'$ and wherein $n$ is an integer greater than 4 and less than 8, R is a member selected from the group consisting of an alkyl radical, an aryl radical, and an aralkyl radical, R' is a member selected from the group consisting of an alkyl radical, an aryl radical, and an aralkyl radical, a reductone of the above formula in which $n$, R, and R' have the same significance as above and in which R and R' are joined by an alkylene chain, and a reductone of the above formula in which $n$, R, and R' have the same significance as above and in which R and R' are joined by an oxygen interrupted alkylene chain.

17. The composition of claim 16 in which the reductone is an amino-glycose-reductone having the formula $C_nH_{(2n-5)}O_{(n-3)}NRR'$ wherein $n$ is an integer greater than 4 and less than 8, R is a member selected from the group consisting of an alkyl radical, an aryl radical, and an aralkyl radical, R' is a member selected from the group consisting of an alkyl radical, an aryl radical, and an aralkyl radical, a reductone of the above formula in which $n$, R, and R' have the same significance as above and in which R and R' are joined by an alkylene chain, and a reductone of the above formula in which $n$, R, and R' have the same significance as above and in which R and R' are joined by an oxygen interrupted alkylene chain.

18. The composition of claim 17 wherein the reductone is a dimethylamino-hexose-reductone.

19. The composition of claim 17 wherein the reductone is a piperidino-hexose-reductone.

20. The composition of claim 16 in which the reductone is an anhydro-amino-glycose-reductone having the formula $C_nH_{(2n-7)}O_{(n-4)}NRR'$ wherein $n$ is an integer greater than 4 and less than 8, R is a member selected from the group consisting of an alkyl radical, an aryl radical, and an aralkyl radical, R' is a member selected from the group consisting of an alkyl radical, an aryl radical, and an aralkyl radical, a reductone of the above formula in which $n$, R, and R' have the same significance as above and in which R and R' are joined by an alkylene chain, an a reductone of the above formula in which $n$, R and R' have the same significance as above and in which R and R' are joined by an oxygen interrupted alkylene chain.

21. The composition of claim 20 wherein the reductone is an anhydro-dimethylamino-hexose-reductone.

22. The composition of claim 20 wherein the reductone is an anhydro-piperidino-hexose-reductone.

References Cited in the file of this patent

UNITED STATES PATENTS

| | | |
|---|---|---|
| 2,063,602 | Hunt et al. | Dec. 8, 1936 |
| 2,152,602 | Ott | Mar. 28, 1939 |